(12) United States Patent
Kardach et al.

(10) Patent No.: US 7,360,945 B2
(45) Date of Patent: Apr. 22, 2008

(54) APPARATUS FOR DETERMINING TEMPERATURE OF A PORTABLE COMPUTER SYSTEM

(75) Inventors: Jim Kardach, San Jose, CA (US); David Williams, San Jose, CA (US); Eric Distefano, Livermore, CA (US); Marlon Cardenas, Mountain House, CA (US); Jim Hermerding, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 11/097,428

(22) Filed: Mar. 31, 2005

(65) Prior Publication Data

US 2006/0221568 A1 Oct. 5, 2006

(51) Int. Cl.
*G01K 1/14* (2006.01)
*G06F 1/20* (2006.01)

(52) U.S. Cl. .................. 374/141; 374/121; 361/687

(58) Field of Classification Search ................ 374/141, 374/121; 361/687
See application file for complete search history.

(56) References Cited

U.S. PATENT DOCUMENTS

| | | | | | |
|---|---|---|---|---|---|
| 4,959,244 | A | * | 9/1990 | Penney et al. | 427/586 |
| 6,023,402 | A | * | 2/2000 | Kaminski | 361/103 |
| 6,058,009 | A | * | 5/2000 | Hood et al. | 361/687 |
| 6,337,630 | B1 | * | 1/2002 | Hass et al. | 340/606 |
| 6,617,815 | B1 | * | 9/2003 | Krief | 318/471 |
| 2003/0002250 | A1 | * | 1/2003 | Yin | 361/687 |
| 2003/0011984 | A1 | * | 1/2003 | Chu et al. | 361/687 |
| 2003/0214781 | A1 | * | 11/2003 | Kolb et al. | 361/687 |
| 2004/0128101 | A1 | | 7/2004 | Hermerding | |
| 2006/0149974 | A1 | | 7/2006 | Rotem et al. | |

* cited by examiner

*Primary Examiner*—Gail Verbitsky
*Assistant Examiner*—Megann E Vaughn
(74) *Attorney, Agent, or Firm*—Blakely, Sokoloff, Taylor & Zafman LLP

(57) ABSTRACT

A method and apparatus for measuring the temperature of a computer system, such as a notebook computer, is described. A sensor module is to mount within the computer system spaced from an interior surface of a chassis of the system, the sensor to measure an internal surface of a chassis of the system.

17 Claims, 4 Drawing Sheets

APPARATUS FOR DETERMINING TEMPERATURE OF A PORTABLE COMPUTER SYSTEM

BACKGROUND OF THE INVENTION

Description of the Related Art

As portable electronic devices, such as notebook computers, become increasingly compact, the electronic components housed within the chassis, such as the framework of a notebook computer, are becoming increasingly hotter. The need to determine the temperature of the chassis of a portable electronic device has become significant. The temperature of the device needs to be measured, so that it can be regulated to preserve the electronic components housed within the electronic device and to protect the user of a portable electronic device from discomfort or harm.

The temperature of an object is typically measured by mounting a device that changes electrical resistance as temperature changes, such as a thermal detector, on to the object. Typical techniques for placing the thermal detector in contact with an object whose temperature is to be measured include wire bonding, epoxy, or soldering. However, these contact techniques may prove undesirable when mounting a thermal detector on the chassis of a portable electronic device, such as a notebook computer, in part due to an increase in the manufacturing cost of the electronic device.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE DRAWINGS

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Methods and apparatus for measuring the temperature of a portable electronic device, such as a notebook computer, are described. In one embodiment, the temperature of the notebook computer is measured using a sensor module mounted within the notebook computer spaced from an interior surface of the chassis of the notebook computer. The sensor module can, in one embodiment, be mounted on a circuit board within the portable computer system, facing an interior surface of the chassis of the system.

Figure 1:
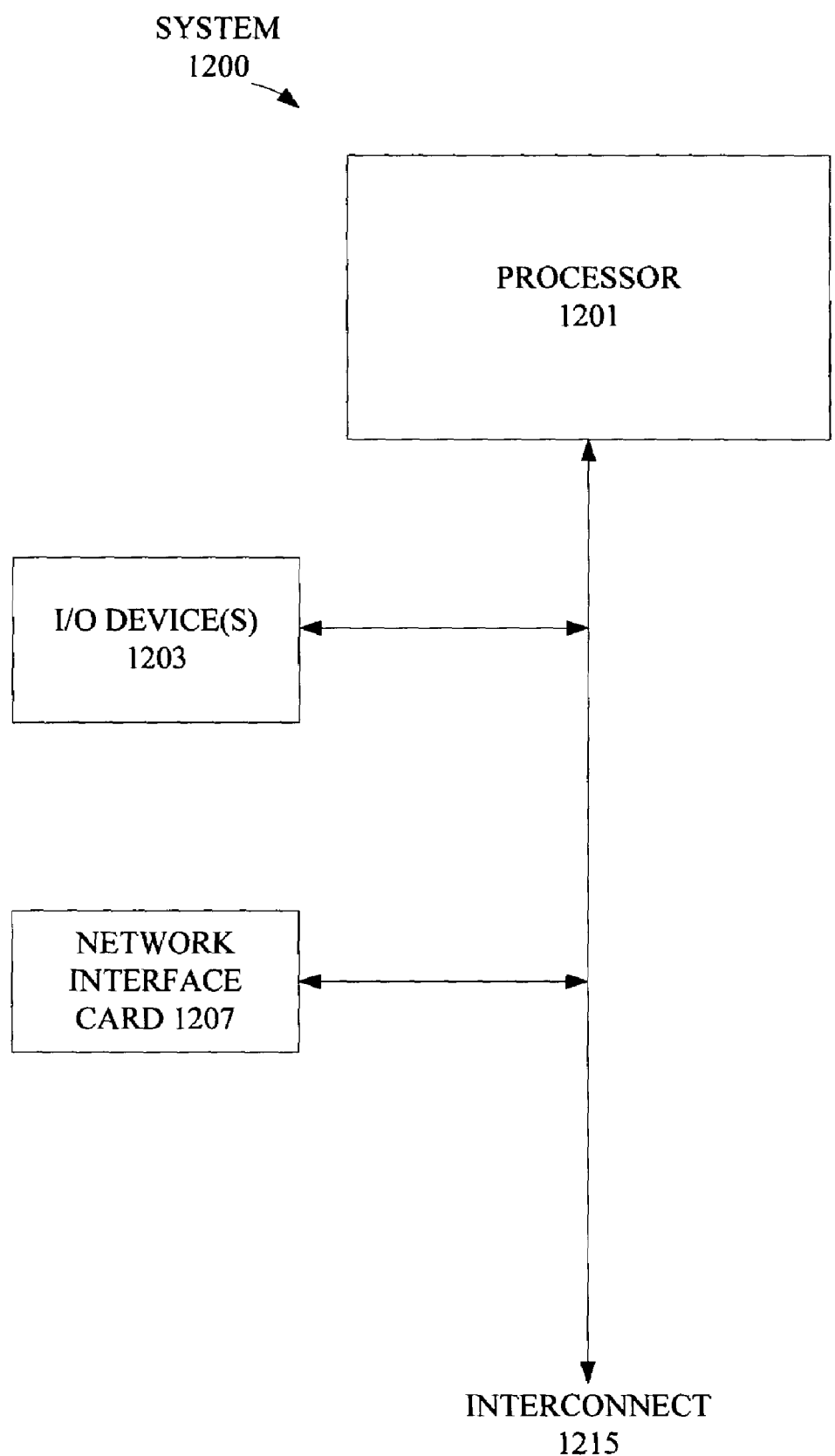
FIG. 1 is a block diagram illustrating one embodiment of a computer system in which the invention can be practiced.

FIG. 1 is a block diagram illustrating one embodiment of a computer system 1200 in which the invention can be practiced. The computer system 1200 comprises a processor(s) 1201, a interconnect 1215, I/O devices 1203 (e.g., keyboard, mouse), and a network interface card 1207 (e.g., an Ethernet card, an ATM card, a wireless network card, etc.). The processor(s) 1201, the I/O devices 1203, and the network interface card 1207 are coupled with the interconnect 1215. The processor(s) 1201 represents a central processing unit of any type of architecture, such as CISC, RISC, VLIW, or hybrid architecture. Furthermore, the processor(s) 1201 could be implemented on one or more chips. The chip with the processor 1201 may have only one processor core or more than one processor core. The interconnect 1215 represents one or more interconnects (e.g., AGP, PCI, ISA, X-Bus, VESA, HyperTransport, etc.) and bridges. While the invention is described in relation to a single processor computer system, the described invention could be implemented in a multi-processor computer system.

Figure 2:
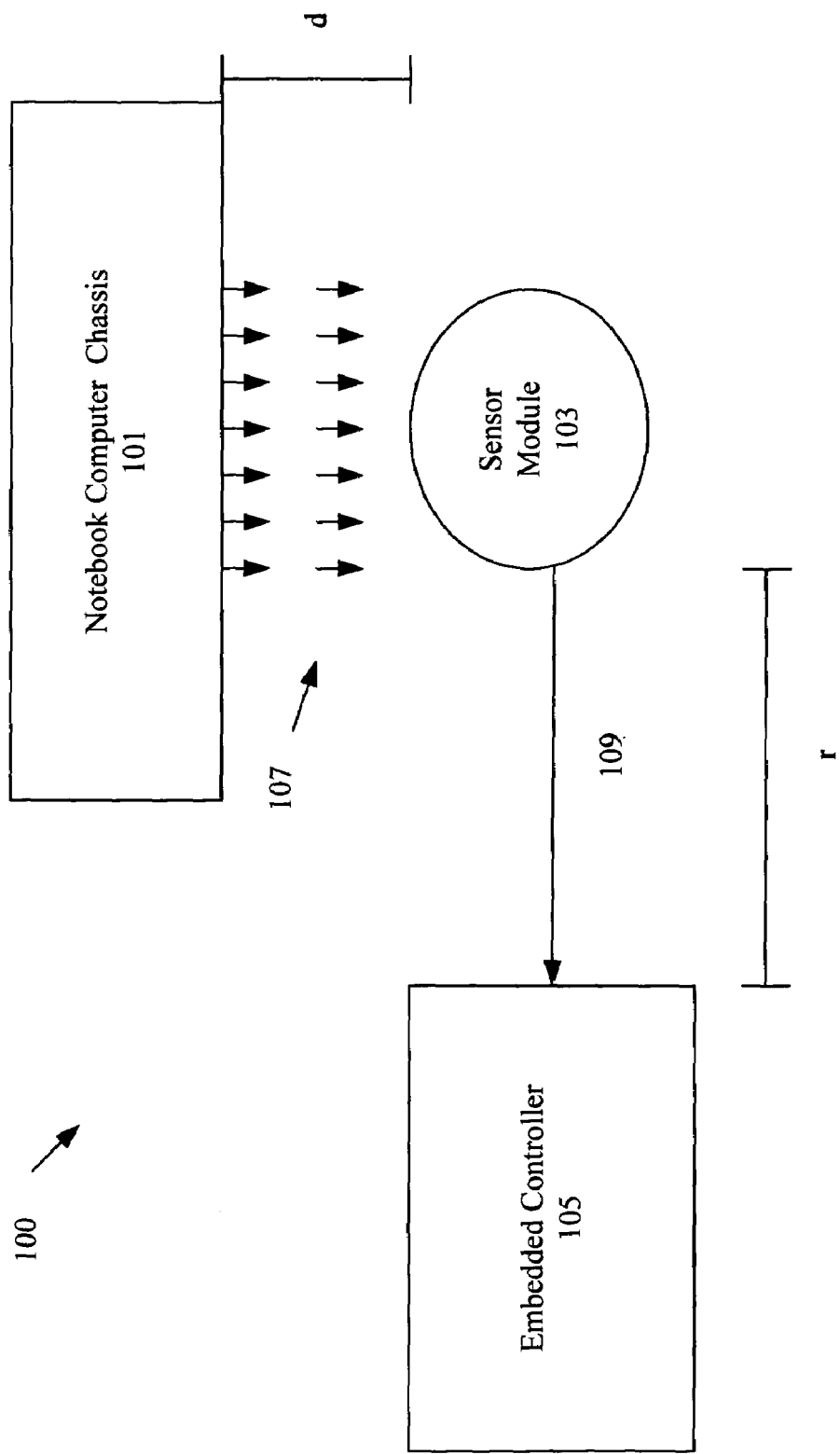
FIG. 2 is an exemplary block diagram of a sensor module mounted within a portable computer in accordance with one embodiment of the invention.

FIG. 2 is a diagram illustrating an embodiment 100 of the sensor module mounted within a notebook computer. The sensor module 103 produces an output, such as a voltage, based on the heat emitted 107 by the notebook chassis 101. The notebook chassis 101 may be the notebook computer skin or enclosure. The sensor module 103 is placed within the notebook computer a distance, d, apart from the notebook chassis 101. In one embodiment, the distance d is based on one or more factors, such as the sensing capabilities of the sensor module 103 and the size of the notebook computer. In one embodiment, since most modern notebook computers are less than 1 inch in thickness, distance d is also less than 1 inch.

A controller 105 can be embedded in the notebook computer to measure the output of the sensor module 103. The sensor module 103 interfaces with the controller 105 via a sensor interface 109. The embedded controller 105 can be located a distance, r, away from the sensor module 103. In one embodiment, the distance r is based on one or more factors, such as the length and width of the notebook computer. Since most modern notebook computers are not more than 2 ft wide, distance r is also less than 2 ft.

The sensor module 103 can be mounted onto a circuit board within the notebook computer facing an interior surface of the notebook computer chassis. This reduces the need of mounting the sensor module 103 onto the notebook computer chassis using epoxy, soldering, and other contact techniques.

In one embodiment, the sensor module 103 is an optical sensor. Accordingly, in one embodiment, the sensor module 103 determines the amount of photons emitted in the radiation of an object corresponding to a local temperature. For example, the sensor module 103 detects photons emitted in the radiation of the chassis of a notebook computer. Optical sensors can be made to respond over a wide range of wavelengths of radiation.

Further, the optical sensor can be an infrared (IR) sensor. Accordingly, in one embodiment, the optical sensor determines the amount of photos in the IR emissions 107 of the components of the notebook computer chassis 101 to generate a voltage corresponding to the temperature of the notebook computer chassis. The IR radiation is emitted by a process known as black-body radiation as described by Maxwell Planck.

In one embodiment, the emitted IR photons may be detected by thermal sensors similar to those used in thermal imaging systems. Alternatively, the IR thermal detectors may be of the kind used in burglar alarm systems as motion detectors. IR thermal sensors may detect the temperature of a component of the computer system without being in contact with the component, so long as it is within a line of sight of the IR photo-detector. In one embodiment, the IR optical sensor functions as a thermopile, thus generating a voltage proportional to the IR radiation power.

In another embodiment, the sensor may operate on other principles such as the pyroelectric effect and the photoelectric effect. The detector may also be made of materials such as Cadmium Mercury Telluride (CMT) and Indium Antimonide (InSb).

Figure 3:
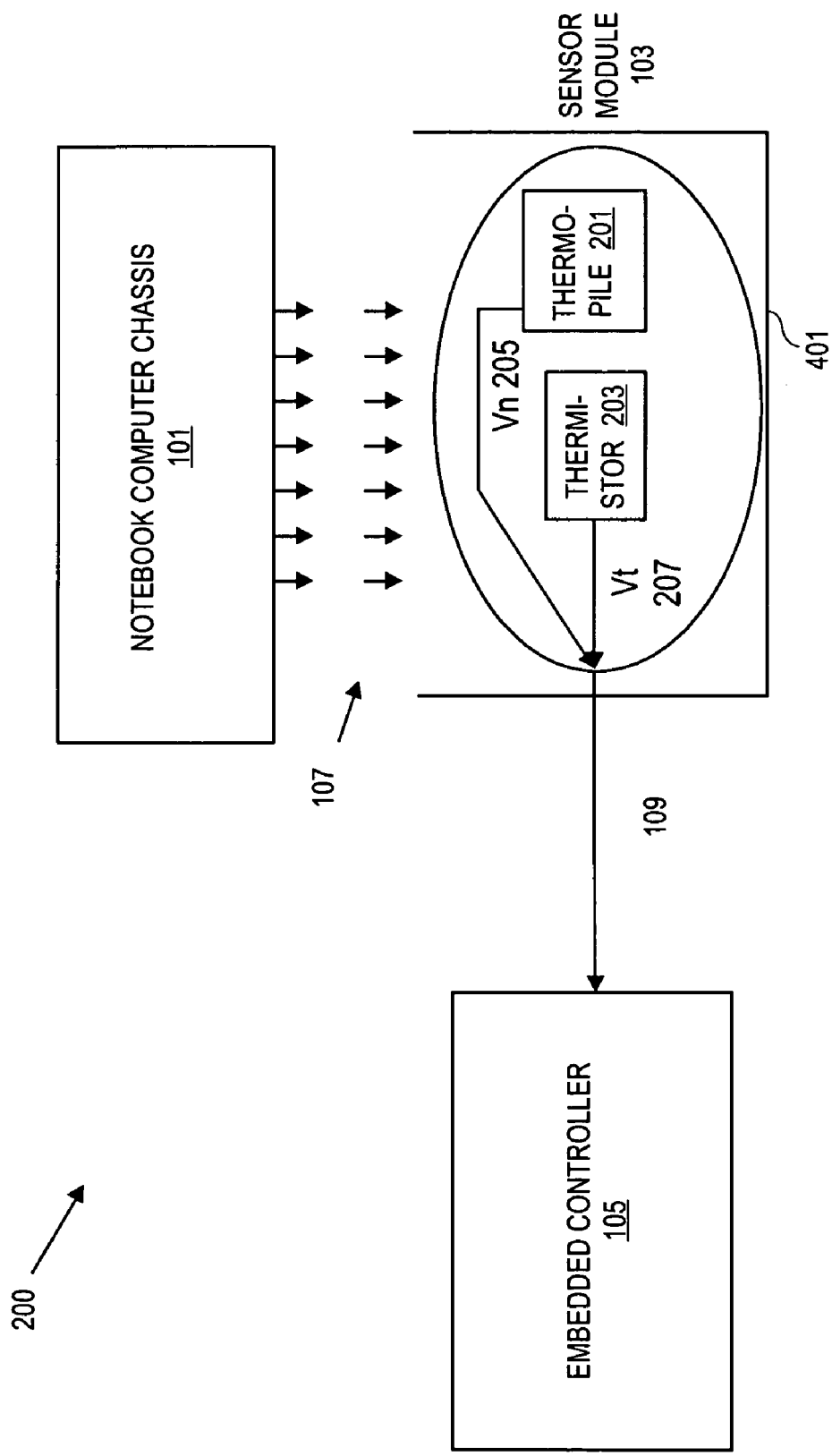
FIG. 3 is an exemplary diagram of a block diagram of the sensor module and an embedded controller in accordance with one embodiment of the invention.

FIG. 3 shows a block diagram 200 of the modules contained within the sensor module 103 and the embedded controller 105 in accordance with one embodiment. The sensor module 103 may include a thermopile 201 to generate a voltage $v_n$ 205 corresponding to the internal ambient temperature of the notebook chassis 101. The internal ambient temperature of the notebook computer system includes a temperature of an internal surface of the chassis of the notebook computer 101. In one embodiment, the sensor module 103 may also include a thermistor 203 to generate a voltage $v_t$ 207 based on the photons emitted by the thermopile 201 corresponding to the thermopile's temperature. The thermistor 203 is a thermally sensitive resistor that exhibits a change in electrical resistance with a change in its temperature. The resistance is measured by passing a small, measured direct current through the thermistor 203 and measuring the voltage drop produced.

The embedded controller 105 receives the voltages $v_n$ 205 and $v_t$ 207. The embedded controller 105 can subtract the $v_t$ 207 from $v_n$ 205 to determine a residual voltage $v_r$ corresponding to the actual temperature $t_a$ of the notebook computer chassis 101. The embedded controller 105 then determines the actual temperature of the notebook computer chassis 101 from the residual voltage $v_r$. In one embodiment, the embedded controller 105 uses a table look up system that correlates the voltage with actual temperature.

In one embodiment, the sensor module 103 is mounted in a location within the notebook computer a distance, d, apart from the notebook computer chassis such that the radiation emitted by other electronic components does not overly influence the voltage produced by the sensor module 103. Such a location of the sensor module 103 provides that the temperature determination $t_a$ made by the embedded controller 105 is the actual temperature of the notebook chassis or approximates it and to the extent possible, does not include the temperature of the electronic components in vicinity of the sensor module 103. In another embodiment, the sensor module 103 is placed within a thermal isolation chamber 401 with an opening facing the notebook chassis 101, such that most of the radiation entering the chamber and causing the thermopile 201 to produce a voltage $v_n$ is being emitted from the notebook computer chassis 101. Also, directional sensors that detect radiation coming from a particular direction can be utilized as sensor module 103.

Figure 4:
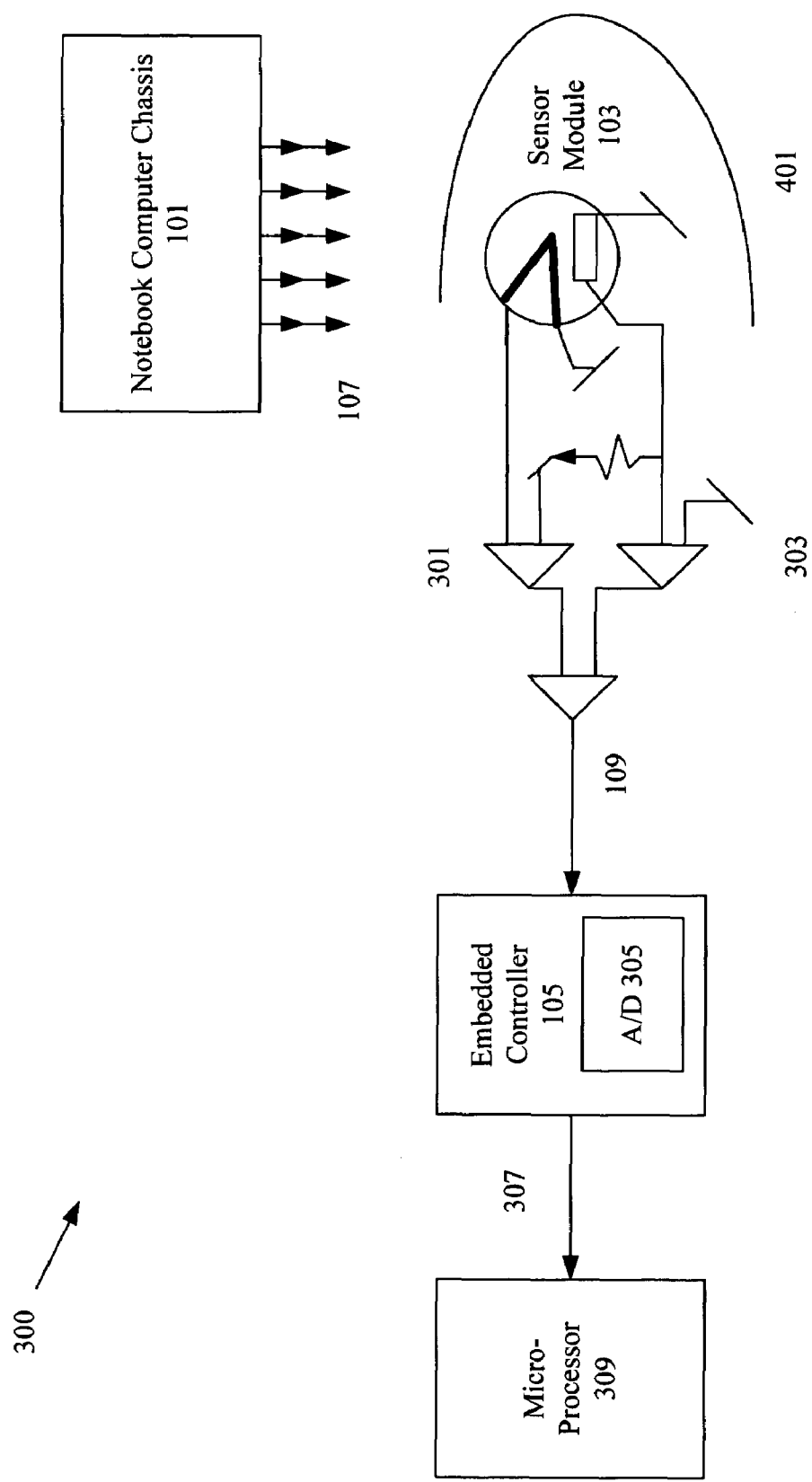
FIG. 4 is an exemplary diagram of interfacing the sensor module to two op-amps in accordance with one embodiment of the invention.

In another embodiment 300, as illustrated in FIG. 4, the sensor module 103 is placed remotely near a hot spot and interfaced to two op-amps 301 and 303. The output $v_t$ 207 of the thermopile 201 is amplified before being sent to the controller 105. The controller 105 determines the actual temperature of the notebook computer chassis 101 from the voltages $v_n$ 205 and $v_t$ 207. The controller 105 may also include an Analog-to-Digital converter 305 to convert the $v_n$ 205 and $v_t$ 207 and/or the actual temperature $t_a$ of the notebook computer chassis 101 to digital values. These digital values can be transmitted to the notebook computer's microprocessor 309 over a interconnect 307.

While the invention has been described in terms of several embodiments, those skilled in the art will recognize that the invention is not limited to the embodiments described. The method and apparatus of the invention may be practiced with modification and alteration within the spirit and scope of the appended claims. The description is thus to be regarded as illustrative instead of limiting on the invention.

What is claimed is:

1. An apparatus comprising:
   a sensor module to mount within a portable computer system spaced from an interior surface of a chassis of the system, the sensor module to measure a chassis temperature of the system, the sensor module includes a first sensor to measure the amount of photons within a predetermined wavelength to determine a temperature of the internal chassis surface and a second sensor to measure a temperature of the first sensor and:
   a controller to determine an exterior chassis surface temperature of the portable computer system according to the temperature of the internal chassis surface, as determined by the first sensor, and the temperature of the first sensor, as measured by the second sensor.

2. The apparatus of claim 1, wherein the second sensor is selected from a group comprising an infrared (IR) sensor, an optical sensor, and a thermopile.

3. The apparatus of claim 1, wherein the sensor module is to measure radiation emitted by the interior surface of the chassis to determine the temperature of the internal chassis surface.

4. The apparatus of claim 1, wherein the sensor module is to mount on a circuit board within the portable computer system, facing a surface of the chassis.

5. The apparatus of claim 1, wherein the sensor module is to be interfaced to two operational amplifiers.

6. The apparatus of claim 5, wherein an output of the two operational amplifiers is used an input to the controller to determine a voltage corresponding to the temperature of the portable computer chassis.

7. The apparatus of claim 1, wherein the sensor module is to be placed within a thermal isolation chamber with an opening facing the chassis of the portable computer system.

8. The apparatus of claim 1, wherein the controller uses the output of the first sensor and the second sensor to determine a voltage corresponding to the temperature of the portable computer chassis.

9. A method comprising:
   detecting radiation emitted by an interior surface of a notebook computer chassis; and
   determining a temperature of the interior surface of a notebook computer chassis, wherein a sensor module includes a first sensor to measure the chassis temperature and a second sensor to measure a temperature of the sensor module, and wherein a controller uses the output of the first sensor module and the second sensor module to determine a voltage corresponding to the temperature of the notebook computer chassis.

10. The method of claim 9, wherein a sensor module is to measure radiation emitted by the interior surface of the chassis to determine the temperature of the interior surface of a notebook computer chassis.

11. The method of claim 10, wherein the sensor module to mount within the notebook computer spaced from the interior surface of a chassis of the notebook computer.

12. The method of claim 10, further comprising measuring the chassis temperature of the notebook computer and measuring a temperature of the sensor module.

13. The method of claim 9, further comprising determining a voltage corresponding to the temperature of the interior surface of the notebook computer chassis.

14. A computer system comprising:
   a chassis;
   a processor housed inside the chassis;
   a memory coupled to the processor through an interconnect;
   a sensor module spaced from an interior surface of the chassis, wherein the sensor module is to be placed within a thermal isolation chamber with an opening facing the chassis of the computer system; and wherein the sensor module includes a first sensor to measure the internal ambient temperature of the system and a second sensor to measure a temperature of the sensor module.

15. The system of claim 14, wherein the second sensor is one of an infrared (IR) sensor, an optical sensor, and a thermopile.

16. The system of claim 14, wherein the sensor measures radiation emitted by the interior surface of the chassis to determine the temperature of the chassis surface.

17. The system of claim 14, wherein the sensor is mounted on a circuit board within the portable computer system, facing a surface of the chassis.

* * * * *